US010583355B2

(12) United States Patent
He (10) Patent No.: US 10,583,355 B2
(45) Date of Patent: Mar. 10, 2020

(54) INFORMATION PROCESSING METHOD AND APPARATUS, ELECTRONIC DEVICE, AND STORAGE MEDIUM (71) Applicant: NETEASE (HANGZHOU) NETWORK CO., LTD., Zhejiang (CN)

(72) Inventor: Zhaoda He, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 33 days.

(21) Appl. No.: 16/116,958

(22) Filed: Aug. 30, 2018

(65) Prior Publication Data

US 2019/0070497 A1 Mar. 7, 2019

(30) Foreign Application Priority Data

Sep. 1, 2017 (CN) .......................... 2017 1 0780029

(51) Int. Cl.
A63F 13/2145 (2014.01)
A63F 13/426 (2014.01)
(Continued)

(52) U.S. Cl.
CPC .......... A63F 13/2145 (2014.09); A63F 13/42 (2014.09); A63F 13/426 (2014.09); A63F 13/533 (2014.09); A63F 13/5375 (2014.09); A63F 13/5378 (2014.09); A63F 13/54 (2014.09); A63F 13/92 (2014.09);
(Continued)

(58) Field of Classification Search
CPC .... A63F 13/2145; A63F 13/533; A63F 13/92; A63F 13/426; A63F 13/54; A63F 13/5378; A63F 13/5375; A63F 13/42; A63F 2300/6081; A63F 2300/6045; A63F 2300/307; A63F 2300/305; A63F 2300/1075; A63F 13/52; A63F 13/35;
(Continued)

(56) References Cited

U.S. PATENT DOCUMENTS

9,530,326 B1 * 12/2016 Ramloll ................... G09B 5/02
2007/0060343 A1 * 3/2007 Sakaguchi ............. A63F 13/10
463/31
(Continued)

Primary Examiner — Abhishek Sarma
(74) Attorney, Agent, or Firm — Gang Yu (57) ABSTRACT An information processing method and apparatus, an electronic device, and a storage medium are provided. The method includes: a first touch area is provided on the graphical user interface, and a virtual character is configured to move in the game scene according to a first touch operation received in the first touch area; when a signal triggering operation acting in the at least one signal icon is detected, an assisting area is provided on the graphical user interface, a position indicator is provided on the mini-map, and a touch sliding operation is detected in a preset operation area of the assisting area, and the assisting area at least partially covers the at least one signal icon; a position of the position indicator in the mini-map is updated according to the touch sliding operation; and when the end of the touch sliding operation is detected, a prompt signal corresponding to the at least one signal icon is sent, and the prompt signal includes position indication information of the game scene.

20 Claims, 3 Drawing Sheets (51) Int. Cl.
*A63F 13/92* (2014.01)
*G06F 3/0484* (2013.01)
*G06F 3/0488* (2013.01)
*A63F 13/533* (2014.01)
*A63F 13/42* (2014.01)
*A63F 13/5375* (2014.01)
*A63F 13/5378* (2014.01)
*A63F 13/54* (2014.01)
*G06F 3/0481* (2013.01)
*G06F 3/0482* (2013.01)

(52) U.S. Cl.
CPC .......... *G06F 3/0482* (2013.01); *G06F 3/0488* (2013.01); *G06F 3/04817* (2013.01); *G06F 3/04845* (2013.01); *G06F 3/04886* (2013.01); *A63F 2300/1075* (2013.01); *A63F 2300/305* (2013.01); *A63F 2300/307* (2013.01); *A63F 2300/6045* (2013.01); *A63F 2300/6081* (2013.01)

(58) Field of Classification Search
CPC .. A63F 13/25; G06F 3/04886; G06F 3/04845; G06F 3/0488; G06F 3/0482; G06F 3/04817
See application file for complete search history.

(56) References Cited

U.S. PATENT DOCUMENTS

| | | | | |
|---|---|---|---|---|
| 2007/0226307 | A1* | 9/2007 | Bae | G07F 17/32 709/206 |
| 2007/0270226 | A1* | 11/2007 | York | A63F 13/00 463/43 |
| 2008/0146328 | A1* | 6/2008 | Ishii | A63F 13/10 463/31 |
| 2011/0265041 | A1* | 10/2011 | Ganetakos | A63F 13/533 715/834 |
| 2012/0077580 | A1* | 3/2012 | Mahajan | A63F 13/60 463/29 |
| 2019/0070495 | A1* | 3/2019 | He | A63F 13/2145 |

* cited by examiner

INFORMATION PROCESSING METHOD AND APPARATUS, ELECTRONIC DEVICE, AND STORAGE MEDIUM

CROSS-REFERENCE TO RELATED APPLICATIONS

The present disclosure claims priority of Chinese Patent Application No. 201710780029.X, filed on Sep. 1, 2017 and named after "Information Processing Method and Apparatus, Electronic Device, and Storage Medium". Contents of the present disclosure are hereby incorporated by reference in entirety of the Chinese Patent Application.

TECHNICAL FIELD

The present disclosure relates to the technical field of games, and in particular to an information processing method and apparatus, an electronic device, and a storage medium.

BACKGROUND

With development of intelligent mobile terminals and game industry, a lot of mobile games with different themes emerge to meet requirements of players. Multiple players in groups for battle in games may be a core gameplay for many mobile games. For example, the core gameplay for Multiplayer Online Battle Arena (MOBA) mobile games is 5V5 group battle. In a process of players in groups for battle in the game, communication and cooperation among the players are crucial. Therefore, whether a convenient and rapid interaction mechanism can be provided for communication among the players or not is an important influencing factor on, player experience in such type of mobile games.

SUMMARY

At least one embodiment of the present disclosure provides an information processing method and apparatus, a storage medium and an electronic device.

In an embodiment of the present disclosure, an information processing method is applied to a mobile terminal having at least one processor for executing a software application and a touch screen which is rendered with a graphical user interface, contents rendered on the graphical user interface include a game scene, a virtual character, a mini-map, and at least one signal icon. The method includes that:

providing a first touch area on the graphical user interface, and a virtual character is configured to move in the game scene according to a first touch operation received in the first touch area; when a signal triggering operation acting in the at least one signal icon is detected, providing an assisting area on the graphical user interface, providing a position indicator on the mini-map, and detecting a touch sliding operation in a preset operation area of the assisting area, and the assisting area at least partially covers the at least one signal icon; updating a position of the position indicator in the mini-map according to the touch sliding operation; and when the end of the touch sliding operation is detected, sending a prompt signal corresponding to the at least one signal icon, the prompt signal comprising position indication information of the game scene.

In another embodiment of the present disclosure, an information processing apparatus is applied to a mobile terminal having at least one processor for executing a software application and a touch screen which is rendered with a graphical user interface, contents rendered on the graphical user interface include a game scene, a virtual character, a mini-map, and at least one signal icon. The apparatus includes:

a first interaction component, configured to provide a first touch area on the graphical user interface, and a virtual character is configured to move in the game scene according to a first touch operation received in the first touch area; a second interaction component, configured to provide, when a signal triggering operation acting in the at least one signal icon is detected, an assisting area on the graphical user interface, provide a position indicator on the mini-map, and detect a touch sliding operation in a preset operation area of the assisting area, and the assisting area at least partially covers the at least one signal icon; a first detection component, configured to update a position of the position indicator in the mini-map according to the touch sliding operation; and a second detection component, configured to send, when the end of the touch sliding operation is detected, a prompt signal corresponding to the at least one signal icon, the prompt signal comprising position indication information of the game scene.

In another embodiment of the present disclosure, an electronic device is provided. The electronic device includes: at least one processor; and at least one memory, connected with the at least one processor, and configured to store at least one executable instruction of the at least one processor, and the at least one processor is configured to execute the information processing method by executing the executable instruction.

In another embodiment of the present disclosure, a computer-readable storage medium is provided, on which at least one computer program may be stored, and the at least one computer program may be executed by at least one processor to implement the information processing method.

DETAILED DESCRIPTION

In order to make those skilled in the art better understand the solutions of the present disclosure, the technical solutions in the embodiments of the present disclosure will be described clearly and completely below with reference to the accompanying drawings in embodiments of the present disclosure.

In the related art, a human-computer interaction designed for players to send communication signals mainly includes the following modes.

At mode one, players send communication signals by inputting text. Since text input would interrupt a game operation, this mode is suitable for players in a non-battling state.

At mode two, a specific control is provided for players to send communication signals. For example, a gather signal sending button is provided for players to signal for a gather to allies. However, since players cannot auto-select a position where the signal is indicated, the players cannot show a definite gathering place to allies.

At mode three, by detecting a click operation of a player in a mini-map on a game interface, then a communication signal will be sent in a position of a game scene, and the position of the game scene is corresponding to a position in the mini-map. Although the player can autonomously select a position where the signal indicated in, the player cannot select the type of the signal (such as gather, attack and retreat), the type of the signal is preset as default by a system, and a selection result may be inconsistent with a real intention of the player. In addition, since a display space of a mobile phone is small, accurate position selection may not be performed in the mini-map, and mis-operation is easily caused. If a zoom-in button is clicked to zoom in the mini-map so as to improve the accuracy of the subsequent operation, the operation is incoherent, and the type of the signal cannot be selected likewise.

In an embodiment of the present disclosure, an information processing method is provided. It should be noted that the steps shown in the flowchart of the drawings may be performed in a computer system such as a set of computer-executable instructions, and although a logical order is shown in the flowchart, in some cases, the illustrated or described steps may be performed in an order other than the above.

Figure 1:
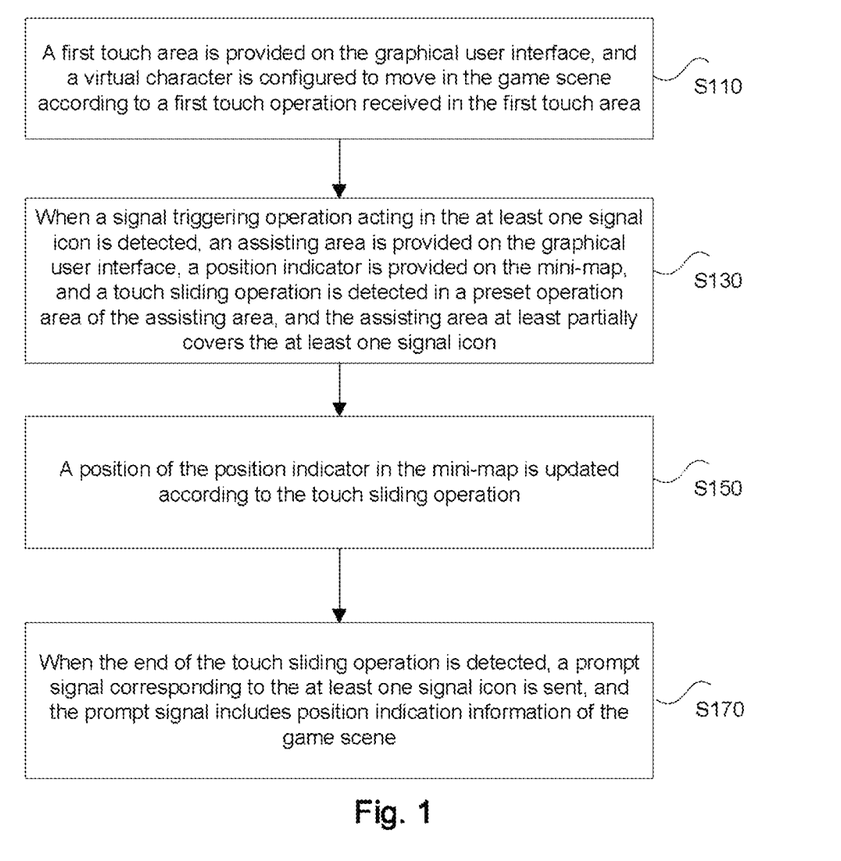
FIG. 1 is a flowchart of an information processing method according to an embodiment of the present disclosure.

FIG. 1 is a flowchart of an information processing method according to an embodiment of the present disclosure. This method is applied to a mobile terminal having at least one processor for executing a software application and a touch screen which is rendered with a graphical user interface, contents rendered on the graphical user interface including a game scene, a virtual character, a mini-map, and at least one signal icon. As shown in FIG. 1, the method may include the steps as follows.

At step S110, a first touch area is provided on the graphical user interface, and a virtual character is configured to move in the game scene according to a first touch operation received in the first touch area.

At step S130, when a signal triggering operation acting in the at least one signal icon is detected, an assisting area is provided on the graphical user interface, a position indicator is provided on the mini-map, and a touch sliding operation is detected in a preset operation area of the assisting area, and the assisting area at least partially covers the at least one signal icon.

At step S150, a position of the position indicator in the mini-map is updated according to the touch sliding operation.

At step S170, when the end of the touch sliding operation is detected, a prompt signal corresponding to the at least one signal icon is sent, and the prompt signal includes position indication information of the game scene.

With the information processing method in the present exemplary embodiment, on the one hand, position information can be sent without requiring a player to manually input any position; on the other hand, it is unnecessary for the player to click a zoom-in button of a mini-map, so that the operation is coherent and convenient, and the type and the position of the signal can be selected. The information processing method provided in the present exemplary embodiment solves the technical problems that a signal position cannot be conveniently specified and an triggering operation is incoherent and inconvenient in sending prompt signal in a mobile terminal game.

In the following, the steps of the information processing method in the present exemplary embodiment will be further described.

In the present exemplary embodiment, a software application is executed on at least one processor of a mobile terminal, and a graphical user interface is rendered on a touch screen of the mobile terminal, contents rendered on the graphical user interface including a game scene, a virtual character, a mini-map, and at least one signal icon.

Figure 2:
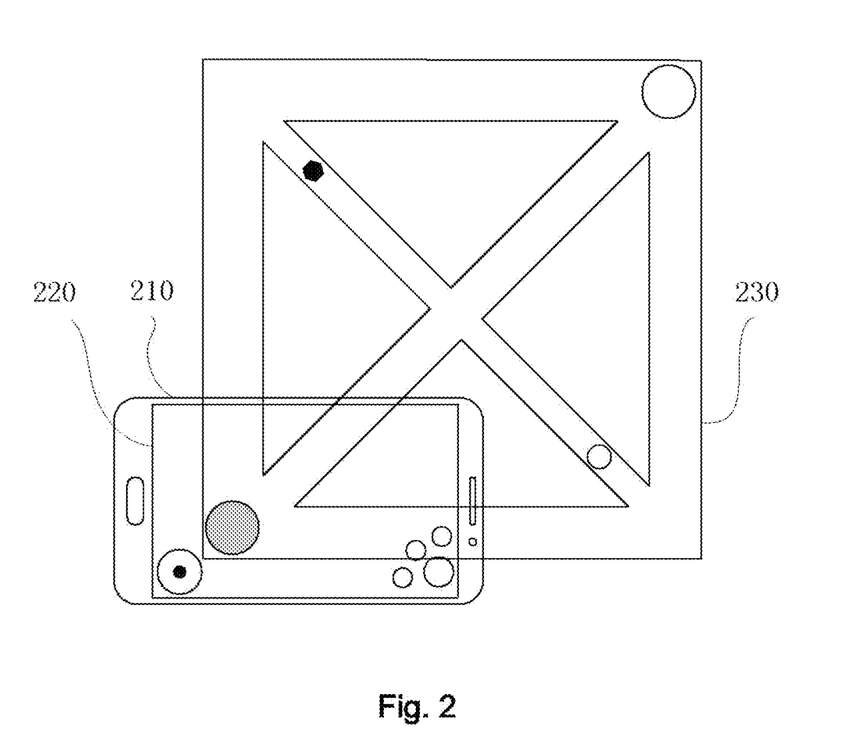
FIG. 2 is a schematic diagram of a game scene according to an embodiment of the present disclosure.

The contents rendered on the graphical user interface may include the entire part of the game scene, and may also be part of the game scene. For example, as shown in FIG. 2, since the game scene 230 is relatively large, local content of the game scene 230 is displayed on the graphical user interface 220 of the mobile terminal 210 during the game.

The mini-map may be a thumbnail of the entire game scene (e.g., 310 in FIG. 3), or may be a thumbnail of a local part of the game scene. Different details may be displayed on the mini-map for different types of games (e.g., details of maps that can be used for assisting a player in determining a position of the virtual character controlled by the player in the game world, real-time positions of ally characters, real-time positions of enemy characters, current vision information of the game scene, etc.). The mini-map may be displayed at the upper left, upper right, or other positions of the graphical user interface. The present exemplary embodiment is not limited to the displayed position of the mini-map.

Figure 3:
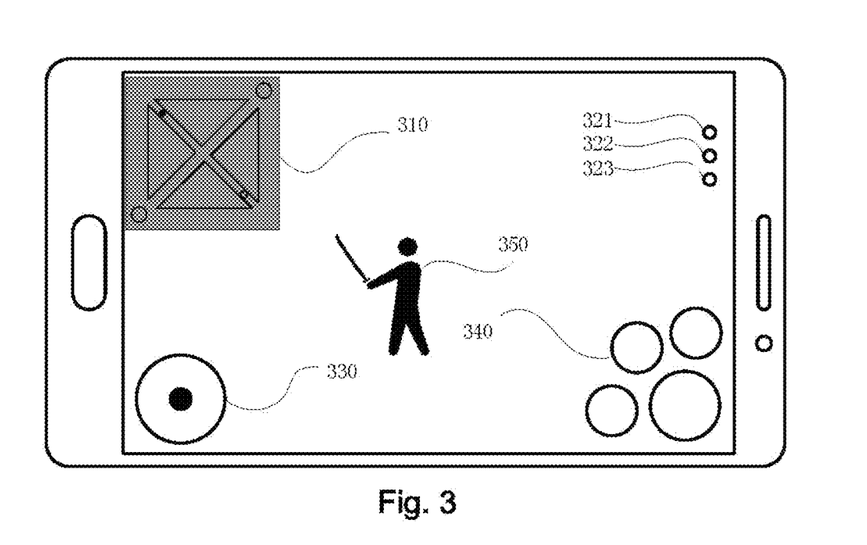
FIG. 3 is a schematic diagram of a graphical user interface of a mobile terminal according to an embodiment of the present disclosure.

The graphical user interface includes at least one signal icon (e.g., signal icons 321, 322, 323 in FIG. 3). The at least one signal icon may be located at the upper left, upper right, or other positions of the graphical interface. The at least one signal icon may also be located on the same or different sides of the graphical user interface. The present exemplary embodiment is not limited to the displayed position of the at least one signal icon.

At step S110, a first touch area is provided on the graphical user interface, and a virtual character is configured to move in the game scene according to a first touch operation received in the first touch area.

The first touch area is provided on the graphical user interface, and the virtual character is configured to move in the game scene according to the first touch operation received in the first touch area.

The first touch area may be a visible area on the graphical user interface, or may be an invisible area. In the first touch control area, an operation area such as a virtual joystick or a direction control virtual button may be displayed, which is not limited in this exemplary embodiment.

As an optional embodiment, the first touch area is the visible area. For example, the touch area may have a bounding box, or the touch area may rendered with a color, or the touch area may rendered with predetermined transparency, or adopt other modes to distinguish the touch area visually. The virtual character is controlled to perform at least one of movement and turning around in the game scene according to a touch operation such as sliding and clicking received in the touch area. A visual area can be positioned quickly by player, and the operation difficulty for a game novice would be reduced.

As another optional embodiment, the first touch area may be set as the invisible area on the graphical user interface. Thus, the first touch area may not cover or affect the game screen, and it can save the screen space and provide a better view for players. However, since the touch area may be set as invisible, and it is hard to be sensed by a player. As an optional implementation solution, a visual guide control may be displayed in the touch area. For example, in an embodiment of the present disclosure, when a virtual joystick is used as a direction controlling solution of a virtual character, the virtual joystick may be displayed in the touch area to visually guide the player.

In an alternative embodiment, the first touch area may also be a virtual cross button area or a virtual D-PAD area. The virtual character is controlled to perform at least one of movement and turning around in the game scene according to a first touch operation received in the virtual cross button area.

In an alternative embodiment, the first touch area is a virtual joystick control area. The virtual character is controlled to perform at least one of movement and turning around in the game scene according to a first touch operation received in the virtual joystick control area.

For example, as shown in FIG. 3, the first touch area is a virtual joystick control area. The virtual joystick control area is located at the lower left of the graphical user interface. A virtual joystick 330 is displayed in this area. The virtual character is controlled to move in the game scene according to a first touch operation received in the virtual joystick control area. Multiple skill icons 340 are provided at the lower right of the graphical user interface for providing the player with a control function of sending skills. Thus, in an alternative embodiment, the virtual character may be controlled to move in the game scene by the left hand, and controlled to cast skills by the right hand. The skills indicated by the skill icons 340 may be an attack skill (e.g., a skill that is capable of reducing a Health Points (HP) value of at least one of enemy characters), a regeneration skill (for example, a skill that is capable of increasing a HP value of at least one of ally characters), and a freezing skill (for example, a skill that is capable of stopping or slowing down actions of the enemy character). In addition, skills corresponding to the skill icons 340 may be a targeting skill, and may also be a non-targeting skill (namely cast by a click). After the skill icons 340 is touched, a virtual joystick for controlling a skill position or direction may be generated in the of the skill icons 340, or at the position of a starting touch point of the touch operation. The player may control the virtual joystick by sliding to set the skill position or direction, and cast the skill when the user finishes touching.

At step S130, when a signal triggering operation acting in the at least one signal icon is detected, an assisting area is provided on the graphical user interface, a position indicator is provided on the mini-map, and a touch sliding operation is detected in a preset operation area of the assisting area, and the assisting area at least partially covers the at least one signal icon.

Figure 4:
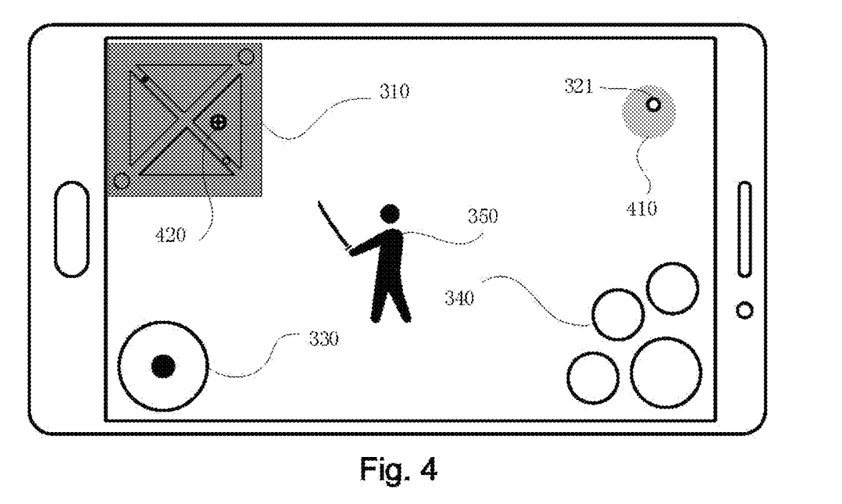
FIG. 4 is a schematic diagram of triggering a prompt signal according to an embodiment of the present disclosure.

In an optional embodiment, as shown in FIG. 4, when a signal triggering operation acting in a signal icon is detected, an assisting area 410 is provided on the graphical user interface, a position indicator 420 is provided on the mini-map, and a touch sliding operation is detected in a preset operation area of the assisting area 410. And the assisting area 410 at least partially covers the at least one signal icon.

An outer contour of the assisting area 410 may be circular, or may be of any shape such as oval, triangle, rectangle, and hexagon. Indication information such as an arrow for indicating a direction may be rendered and displayed on the assisting area 410. Alternatively, the assisting area may be rendered on the graphical user interface with a preset transparency.

The position indicator 420 is used for indicating the position in the mini-map 310. The initial position of the position indicator 420 may be a preset position in the mini-map 310 (for example, the center of the mini-map 310), or may be a position associated with the position of the virtual character 350 (for example, the current position of the virtual character 350 in the game scene is a point A, the point A in the game scene corresponds to a point B in the mini-map, and the initial position of the position indicator 420 is at the point B in the mini-map), or may also be any other position. The position indicator 420 is generated at the center of the mini-map 310, which enables the player to control the movement of the position indicator 420 to other positions to be indicated in the mini-map 310 with less touch operations. The position indicator 420 is generated at a position corresponding to the virtual character controlled by the player in the mini-map 310, which enables the player to control the position indicator 420 to indicate the position near the virtual character with less touch operations.

The preset operation area of the assisting area 410 may be equal to or larger than the of the assisting area 410.

At step S150, a position of the position indicator in the mini-map is updated according to the touch sliding operation. The step includes: the position of the position indicator in the mini-map is updated according to a sliding track of the touch sliding operation.

For example, the movement of the position indicator 420 may be controlled according to a moving track of a touch point of the touch sliding operation in the preset operation of the assisting area 410. Alternatively, in order to avoid mis-operation, at least one of display and movement of the position indicator 420 may be limited in the area of the mini-map 310.

In an alternative embodiment, an operation assisting object (not shown in FIG. 4) may also be rendered and displayed in the assisting area 410. The assisting area 410 and the operation assisting object jointly compose a virtual joystick. The shapes of the assisting area 410 and the operation assisting object may be circular. An initial position of the operation assisting object may be a center of the assisting area 410. Alternatively, the shape of assisting area 410 and the operation assisting object may be oval, triangular, rectangular, hexagonal, other polygonal, etc., or irregular (e.g., horseshoe-shaped, tiger head-shaped, bear paws-shaped, etc.). Alternatively, the operation assisting object is located at a predetermined position in the assisting area 410, and is not limited to the center or the centroid of the assisting area 410. Indication information such as an arrow for indicating a direction may be rendered and displayed on the assisting area 410. The operation assisting object may be controlled to move in the preset operation area of the assisting area 410 according to the touch sliding operation, and the position of the position indicator 420 in the mini-map 310 is determined according to the position of the operation assisting object in the preset operation area of the assisting area 410. There may be multiple specific implementation manners for determining the position of the position indicator 420 in the mini-map 310 and the present disclosure does not perform limitations herein. For example, a moving direction of the operation assisting object in the preset operation area of the assisting area 410 is taken as a moving direction of the position indicator 420 in the mini-map 310, and a moving distance of the operation assisting object in the preset operation area of the assisting area 410 multiplies a preset coefficient is taken as a moving distance of the position indicator 420 in the mini-map 310.

At step S170, when the end of the touch sliding operation is detected, a prompt signal corresponding to the at least one signal icon is sent, and the prompt signal includes position indication information of the game scene.

For example, if the touch object (e.g., a finger or a touch pencil) is detected to leave a touch screen, a prompt signal corresponding to the signal icon is sent (e.g., attack, retreat, etc.), and the prompt signal includes position indication information of the game scene.

The function of the prompt signal is used for prompting other players (e.g., allies in a team game) in the game. Therefore, the prompt signal may be sent through a game server, so that a corresponding signal is displayed on the game graphical user interface of a ally's game operating device. Of course, corresponding signals may also be displayed on the game graphical user interfaces of all allies' or all players' devices.

In an alternative embodiment, when the end of the touch sliding operation is detected and the position indicator is located in the mini-map, a prompt signal corresponding to the signal icon is sent, and the prompt signal includes position indication information of the game scene. In an optional embodiment, in order to avoid mis-operation, at least one of display and movement of the position indicator 420 may be limited in the mini-map 310.

Figure 5:
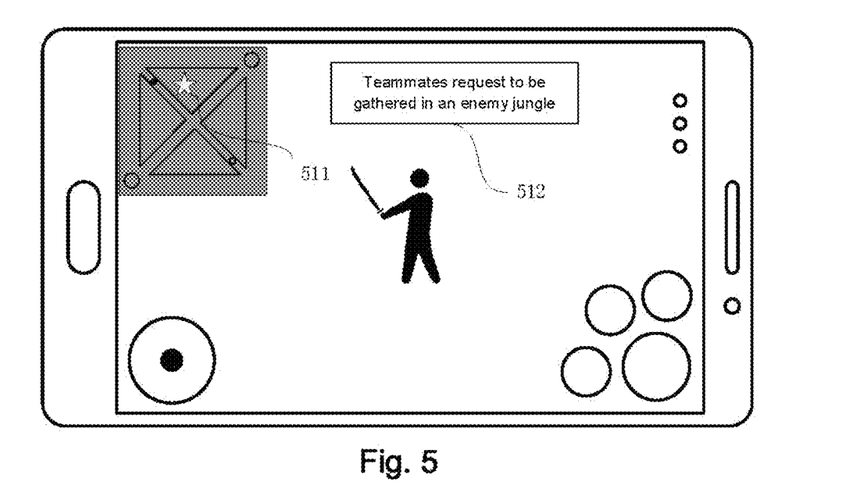
FIG. 5 is a schematic diagram of displaying a prompt signal according to an embodiment of the present disclosure.

In an alternative embodiment, after sending the corresponding prompt signal, the position of the game scene indicated by the position indication information of the game scene is identified on the mini-map, as position 511 shown in FIG. 5.

In an alternative embodiment, when a prompt signal sent by other terminals is received, the position of the game scene indicated by the position indication information of the game scene is identified on the mini-map, as position 511 shown in FIG. 5.

One of the technical problems to be solved by the present disclosure is to provide an interaction mechanism that the player could send position information without manually inputting position information. A prompt signal includes position indication information of the game scene, on the one hand, the position information can be sent without requiring the player to manually input the position, on the other hand, it is unnecessary for the player to click a zoom-in button of the mini-map, the operation is more consistent and convenient, and the type of the signal can be selected. In an alternative embodiment, a player terminal receives the prompt signal, and identifies a corresponding position on the mini-map according to the position indication, so that the player can intuitively see the position indicated by the prompt signal on a panoramic thumbnail of the game scene. The prompt signal may be shown as a dynamic special effect, such as a flashing highlighting prompt. As another alternative embodiment, a terminal sends the prompt signal, and identifies the position indicated by the prompt signal on the mini-map, so that the player can obtain good operational feedback.

In addition to the position indication information, the prompt signal may also include voice prompt information and text prompt information, or a reminding voice and a reminding text (e.g., 512 in FIG. 5). For example, a reminding voice (e.g., when a player selects "gather", audio information "gather" of voice reminding is sent to the terminals of other players) may be sent to terminals of other players, and voice reminding indication information may also be sent to the terminals of other players to instruct the terminals of other players to play the corresponding and pre-stored voice audio.

In an alternative embodiment, position indication information of the game scene includes position information in the game scene and the position information corresponds to the current position of the position indicator in the area of the mini-map.

For example, when the end of the touch sliding operation is detected, the position of the position indicator 420 in the mini-map is a point A. According to a corresponding relationship between the mini-map and the game scene, a position point B in the game scene may be determined. Position indication information of the game scene includes position indication information of the point B (it should be noted that position indication information of the point B may be the coordinates of the point B in the game scene, or the coordinates of the point A corresponding to the point B in the mini-map, or other position indication information capable of directly or indirectly indicating the position of the point B). Or, when the end of the touch sliding operation is detected, the position of the position indicator 420 in the area of a mini-map is a point A. According to a corresponding relationship between the mini-map and the game scene, a position point B in the game scene may be determined, the point B is located in a specific area C (e.g., a jungle C) in the game scene, and position indication information of the game scene includes position indication information of the specific area C.

In another embodiment of the present disclosure, an information processing apparatus is also provided. This apparatus is applied to a mobile terminal having at least one processor for executing a software application and a touch screen which is rendered with a graphical user interface, contents rendered on the graphical user interface including a game scene, a virtual character, a mini-map, and at least one signal icon. The apparatus includes:

a first interaction component, configured to provide a first touch area on the graphical user interface, and a virtual character is configured to move in the game scene according to a first touch operation received in the first touch area;

a second interaction component, configured to provide, when a signal triggering operation acting in the at least one signal icon is detected, an assisting area on the graphical user interface, provide a position indicator on the mini-map, and detect a touch sliding operation in a preset operation area of the assisting area, and the assisting area at least partially covers the at least one signal icon;

a first detection component, configured to update a position of the position indicator in the mini-map according to the touch sliding operation; and a second detection component, configured to send, when the end of the touch sliding operation is detected, a prompt signal corresponding to the at least one signal icon, the prompt signal comprising position indication information of the game scene.

In another embodiment of the present disclosure, an electronic device is also provided. The electronic device includes: a processing component, which may further include at least one processor, and a memory resource represented by at least one memory and configured to store at least one instruction executable by the processing component, such as at least one application program. The at least one application program stored in the at least one memory may include at least one component each corresponding to a set of instructions. In addition, the processing component is configured to execute instructions to perform the above-described information processing method.

The electronic device may also include: a power supply component, configured to perform power management on the executed electronic device; a wired or wireless network interface, configured to connect the electronic device to a network; and an input output (I/O) interface. The electronic device may operate based on an operating system stored in a memory, such as Android, iOS, Windows, Mac OS X, Unix, Linux, FreeBSD, or the like.

In another embodiment of the present disclosure, a computer-readable storage medium is also provided. A program product capable of implementing the above method of the present specification is stored thereon. In some possible implementation manners, various aspects of the present disclosure may also be implemented in the form of a program product, which includes at least one program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include a program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of at least one readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

The sequence numbers of the foregoing embodiments of the present disclosure are merely for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

Apparently, the described embodiments are a part of the embodiments of the present disclosure, not all of the embodiments. On the basis of the embodiments of the present disclosure, all other embodiments obtained on the premise of no creative work of those skilled in the art fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in an element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. An information processing method, applied to a mobile terminal having at least one processor for executing a software application and a touch screen which is rendered with a graphical user interface, contents rendered on the graphical user interface comprising a game scene, a virtual character, a mini-map, and at least one signal icon, the method comprising:

providing a first touch area on the graphical user interface, wherein a virtual character is configured to move in the game scene according to a first touch operation received in the first touch area;

when a signal triggering operation acting in the at least one signal icon is detected, providing an assisting area on the graphical user interface, providing a position indicator on the mini-map, and detecting a touch sliding operation in a preset operation area of the assisting area, wherein the assisting area at least partially covers the at least one signal icon;

updating a position of the position indicator in the mini-map according to the touch sliding operation; and when the end of the touch sliding operation is detected, sending a prompt signal corresponding to the at least one signal icon, the prompt signal comprising position indication information of the game scene.

2. The information processing method as claimed in claim 1, further comprising:

after sending the prompt signal, identifying the position of the game scene indicated by the position indication information in the mini-map.

3. The information processing method as claimed in claim 1, further comprising:

when the prompt signal sent by other terminals is received, identifying the position of the game scene indicated by the position indication information in the mini-map.

4. The information processing method as claimed in claim 1, wherein the prompt signal further comprises at least one of the following: voice prompt information and text prompt information.

5. The method as claimed in claim 1, wherein the first touch area is a virtual joystick control area.

6. The information processing method as claimed in claim 1, wherein the position indication information comprises position information in the game scene, the position information corresponds to a current position of the position indicator in the mini-map.

7. The information processing method as claimed in claim 1, wherein providing the assisting area on the graphical user interface comprises:

rendering the assisting area on the graphical user interface with a preset transparency.

8. The information processing method as claimed in claim 1, wherein an outer contour of the assisting area is circular.

9. The information processing method as claimed in claim 1, wherein updating the position of the position indicator in the mini-map according to the touch sliding operation comprises:

updating the position of the position indicator in the mini-map according to a sliding track of the touch sliding operation.

10. An information processing apparatus, applied to a mobile terminal having at least one processor for executing a software application and a touch screen which is rendered with a graphical user interface, contents rendered on the graphical user interface comprising a game scene, a virtual character, a mini-map, and at least one signal icon, the apparatus comprising:

a first interaction component, configured to provide a first touch area on the graphical user interface, wherein a virtual character is configured to move in the game scene according to a first touch operation received in the first touch area;

a second interaction component, configured to provide, when a signal triggering operation acting in the at least one signal icon is detected, an assisting area on the graphical user interface, provide a position indicator on the mini-map, and detect a touch sliding operation in a preset operation area of the assisting area, wherein the assisting area at least partially covers the at least one signal icon;

a first detection component, configured to update a position of the position indicator in the mini-map according to the touch sliding operation; and a second detection component, configured to send, when the end of the touch sliding operation is detected, a prompt signal corresponding to the at least one signal icon, the prompt signal comprising position indication information of the game scene.

11. A computer-readable storage medium, on which at least one computer program is stored, wherein the at least one computer program is executed by at least one processor to implement the information processing method as claimed in claim 1.

12. An electronic device, comprising:

at least one processor; and at least one memory, configured to store at least one executable instruction of the at least one processor, wherein the at least one processor is configured to execute the at least one executable instruction to perform the signal processing method as claimed in claim 1.

13. The method as claimed in claim 1, wherein the first touch area is a visible area on the graphical user interface.

14. The method as claimed in claim 1, wherein when the first touch area is an invisible area on the graphical user interface, a visual guide control is displayed on the first touch area.

15. The method as claimed in claim 1, wherein an initial position of the position indicator in the mini-map is a preset position in the mini-map.

16. The method as claimed in claim 1, wherein an initial position of the position indicator in the mini-map is a position associated with a current position of the virtual character in the game scene.

17. The method as claimed in claim 1, wherein the preset operation area of the assisting area is equal to or larger than the assisting area.

18. The method as claimed in claim 1, wherein the assisting area and an operation assisting object jointly compose a virtual joystick, wherein an initial position of the operation assisting object is located at a predetermined position of the assisting area.

19. The method as claimed in claim 18, further comprising:

determining the position of the position indicator in the mini-map according to a position of the operation assisting object in the preset operation area of the assisting area.

20. The method as claimed in claim 2, further comprising:

after sending the prompt signal, identifying, by a terminal received the prompt signal, a corresponding position in the mini-map according to the prompt signal.

* * * * *